SELF-QUENCH SUPERREGENERATIVE AMPLIFIER

Filed May 22, 1948 2 Sheets-Sheet 1

INVENTOR.
DONALD RICHMAN

BY John A. Harvey

ATTORNEY

SELF-QUENCH SUPERREGENERATIVE AMPLIFIER
Filed May 22, 1948 2 Sheets-Sheet 2
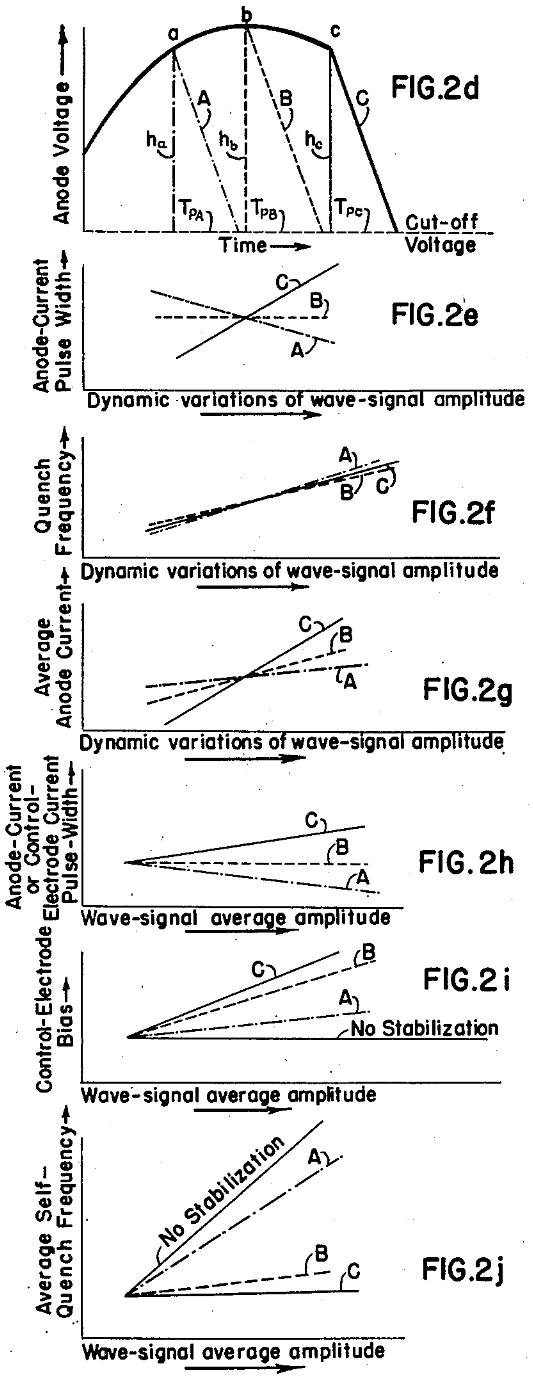
FIG. 2d, FIG. 2e, FIG. 2f, FIG. 2g, FIG. 2h, FIG. 2i, FIG. 2j
FIG. 2k
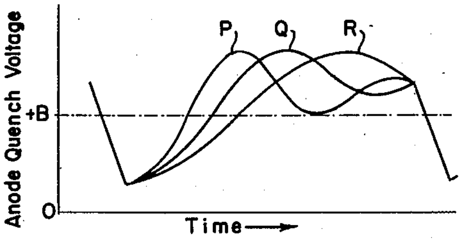
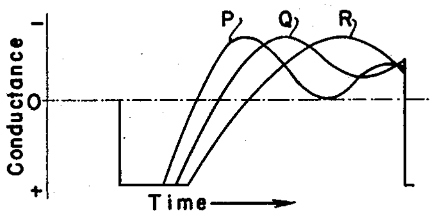
FIG. 2ℓ
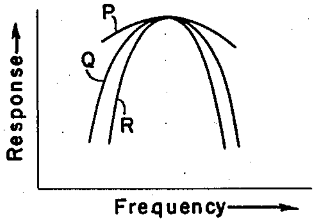
FIG. 2m
INVENTOR.
DONALD RICHMAN
BY John A. Harvey
ATTORNEY Patented June 30, 1953

2,644,080

UNITED STATES PATENT OFFICE 2,644,080

SELF-QUENCH SUPERREGENERATIVE AMPLIFIER

Donald Richman, Flushing, N. Y., assignor to Hazeltine Research, Inc., Chicago, Ill., a corporation of Illinois Application May 22, 1948, Serial No. 28,595

2 Claims. (Cl. 250—20)

Figures 2A, 2B, 2C:
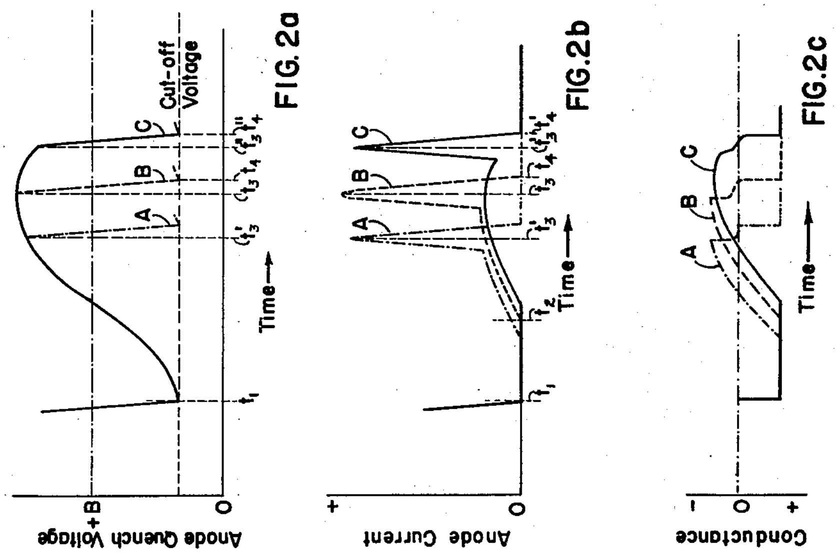

The present invention is directed to self-quench superregenerative amplifiers adapted for operation in the saturation-level mode. While the invention is of general application, it has particular utility in connection with superregenerative wave-signal receivers and hence will be described in that environment.

Superregenerative receivers of the self-quench type have found wide utility due to their exceedingly high sensitivity, extreme simplicity, and inexpensive construction. For some applications, however, for example those requiring operation at very high quench rates, such receivers have not always afforded operation as satisfactory as is often desired. In general, this was due to the fact that the available transconductance of a suitable regenerator tube for the receiver was not of sufficient magnitude during the very short negative-conductance intervals of the superregenerative receiver to provide the superregenerative gain necessary to permit oscillations to increase at a sufficiently high rate. Consequently, when such receivers were operated at very high quench frequencies they required small positive damping. This resulted in insufficient quenching of the oscillations after each cycle of quench and the stability of operation of such receivers tended to be rather poor.

A carefully designed conventional self-quench superregenerative receiver operating at a relatively low quench frequency has a band-width or selectivity characteristic which, measured at one napier below the peak of the characteristic, is about ten or more times the quench frequency thereof. It will be apparent that the selectivity of such a receiver when operating at very high quench frequencies becomes relatively poor, a condition which is undesirable for many applications. As is more fully explained in applicant's abandoned copending application, Serial No. 15,245, filed March 16, 1948, and entitled "Superregenerative Amplifier," the shape of the conductance characteristic of a superregenerative receiver in the region where the conductance changes from a positive to a negative value is effective to determine the band-pass or selectivity characteristic of the receiver. A superregenerative receiver having a conductance characteristic with a gradual slope in this region affords good selectivity. To procure such a conductance characteristic in a self-quench superregenerative receiver operating at high quench frequencies, while at the same time providing the necessary superregenerative gain in the required short time interval, a large peak transconductance is required of the regenerator tube. It is therefore important from a selectivity standpoint that the regenerator tube of a self-quench superregenerative receiver operating at high quench frequencies be capable of providing a high transconductance.

The frequency-determining or signal-resonant circuit of a self-quench superregenerative receiver customarily has a damping resistor coupled in shunt therewith to provide adequate positive damping of the oscillations appearing in this circuit during each positive-conductance interval of the receiver. In an endeavor to procure greater superregenerative gain from prior self-quench superregenerative receivers operating at high quench frequencies, the expedient of increasing the value of such a resistor has frequently been adopted. Although this tended to improve the superregenerative gain of the receiver, it seriously reduced the extent of damping of oscillations during the positive-conductance intervals of the superregenerative circuit so that undesirable distortion often resulted. Sufficient reduction in the extent of this positive damping usually caused the regenerative circuit to produce sustained oscillations so that all superregenerative reception was sacrificed. Consequently, the expedient mentioned above has proved generally unsatisfactory for use in connection with conventional self-quench superregenerative receivers operating at very high quench frequencies.

It is an object of the present invention, therefore, to provide a new and improved self-quench superregenerative amplifier which avoids one or more of the above-mentioned limitations and disadvantages of prior such receivers.

It is another object of the invention to provide a new and improved self-quench superregenerative amplifier which is particularly adapted for operation at very high self-quench frequencies.

It is a further object of the invention to provide a new and improved self-quench superregenerative receiver which is characterized by its high selectivity even though the receiver is operating at very high quench rates.

It is a still further object of the invention to provide a new and improved self-quench superregenerative receiver which is capable of providing an output signal of large amplitude.

It is yet another object of the invention to provide a new and improved self-quench superregenerative receiver which is capable of operation at very high quench rates and yet possesses a high stability of its operating characteristics.

It is an additional object of the invention to provide a new and improved self-quench superregenerative amplifier which permits a relatively wide range of control of the wave form of the developed self-quench voltage easily and readily to be effected.

In accordance with a particular form of the invention, a self-quench superregenerative amplifier comprises a self-quench saturation-level type of superregenerative circuit, including a regenerator tube having a plurality of electrodes including a control electrode and a cathode and having during saturation-level intervals of the superregenerative circuit a nonlinear signal-translating characteristic for a wave signal applied to that circuit for deriving therein a rectification component of saturation-level current, a signal-resonant circuit coupled to the electrodes, and an auxiliary resonant quench-voltage generating circuit coupled between a predetermined pair of the electrodes and responsive to the aforesaid rectification component for generating at least the major portion of a quench voltage of variable magnitude which periodically produces alternate build-up and oscillation-decay intervals in the signal-resonant circuit and effects superregenerative amplification of the applied wave signal. The auxiliary resonant circuit includes a condenser and has a resonant frequency much less than that of the signal-resonant circuit and within the range of one-third to two-thirds the average self-quench frequency of the superregenerative circuit. The product of the capacitance of the condenser and the reciprocal of the conductance appearing between the aforesaid pair of the electrodes of the regenerator tube during each saturation-level interval of the superregenerative circuit causes the auxiliary resonant circuit to have during that interval a time constant of damping which is shorter than the average self-quench period of the superregenerative circuit. The self-quench superregenerative amplifier further includes a time-constant network coupled between the aforesaid control electrode and cathode and having a time constant at least as great as that of each saturation-level interval of the superregenerative circuit for deriving from the control-electrode current during each quench cycle a control effect which assures the self-quenching of the superregenerative circuit. The self-quench superregenerative amplifier additionally includes a time-constant network, having a time constant much greater than the average self-quench period of the superregenerative circuit and coupled between the aforesaid control electrode and cathode and responsive to an electrode current of the regenerator tube during at least the saturation-level interval of the superregenerative circuit for developing and applying to the control electrode a gain-control potential effective to stabilize the operating characteristics of the amplifier against operating conditions which tend to modify the average self-quench frequency thereof.

For a better understanding of the present invention, together with other and further objects thereof, reference is had to the following description taken in connection with the accompanying drawings, and its scope will be pointed out in the appended claims.

Figures 1, 3:
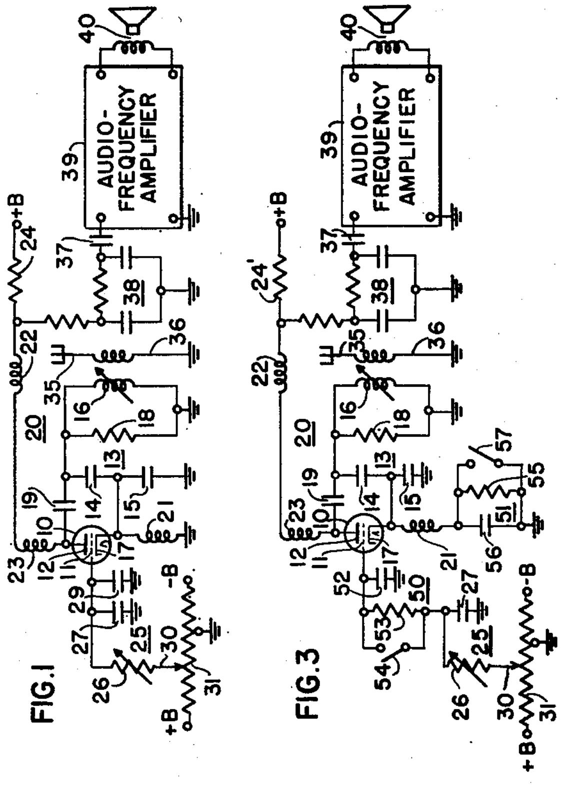
Figure 4:
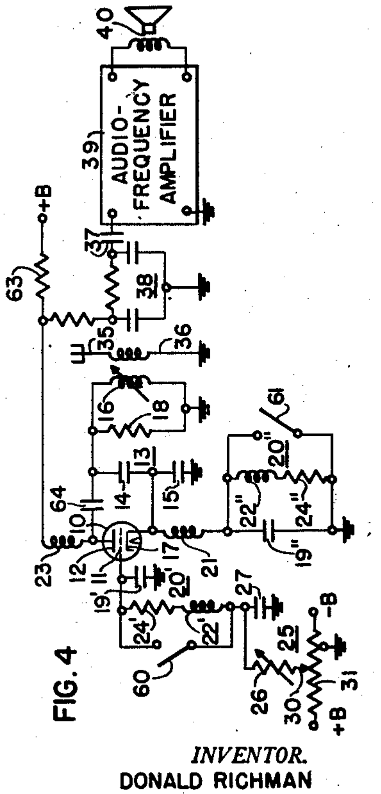

Referring now to the drawings, Fig. 1 is a circuit diagram, partly schematic, of a complete self-quench superregenerative receiver embodying the present invention in a particular form; Figs. 2*a* to 2*m* are a series of graphs utilized in explaining the operation of the receiver of Fig. 1; and Figs. 3 and 4 are circuit diagrams, partly schematic, representing self-quench superregenerative receivers embodying modified forms of the invention.

Referring now more particularly to Fig. 1 of the drawings, the self-quench superregenerative receiver there represented comprises a self-quench saturation-level type of superregenerative circuit, including a regenerator tube 10 having a control electrode 11 and an anode 12 which are effectively coupled, in a manner more fully to be described hereinafter, across a signal-resonant or frequency-determining circuit 13. The tube 10 has during saturation-level intervals of the superregenerative circuit a nonlinear signal-translating characteristic for a wave signal applied to the superregenerative circuit for deriving in that circuit a rectification component of the saturation-level current. The signal-resonant circuit 13 includes serially connected condensers 14 and 15, which are coupled between ground and the anode of the tube 10 through a condenser 19, and also includes an adjustable inductor 16 which is coupled in shunt with the condensers 14 and 15 for tuning the resonant circuit. A damping resistor 18 is included in the signal-resonant circuit 13 and is coupled in shunt with the inductor 16 to provide sufficient positive damping within the signal-resonant circuit during each positive-conductance interval of the receiver to ensure that the oscillations developed in each quench cycle decrease to an insignificant amplitude before the initiation of a subsequent quench cycle. The tube 10 has a cathode 17 which is coupled to the junction of the condensers 14 and 15 and is also coupled to ground through a radio-frequency choke coil 21.

The superregenerative receiver also includes an auxiliary resonant quench-voltage generating circuit 20, comprising the condenser 19 and an inductor 22, which is coupled between the anode and the cathode of the tube 10 in a manner to be described more fully hereinafter and is responsive to the rectification component previously mentioned for generating at least the major portion of a quench voltage of variable magnitude. One terminal of the inductor 22 is coupled to the anode of the tube 10 through a radio-frequency choke coil 23 while the other terminal thereof is coupled through a resistor 24 to a source of potential, indicated as +B. The auxiliary resonant circuit 20 may have a resonant frequency within the region of $\frac{1}{10}$ to 10 times the average self-quench frequency of the superregenerative circuit. This resonant frequency may be, for example as represented in Fig. 2, with the range of about one-third to two-thirds the average self-quench frequency and thus approximately equal to one-half the average self-quench frequency.

The impedance parameters of this auxiliary resonant circuit 20, specifically the product of the capacitance of the condenser 19 and the reciprocal of the conductance appearing between the anode and the cathode of the tube 10 during each saturation-level interval of the superregenerative circuit causes the auxiliary resonant circuit 20 to have during this interval a time constant of damping which is shorter than the average self-quench period of the superregenerative circuit. The time constant of the network including the resistor 24 and the condenser 19 is much greater than the time constant of damping of the auxiliary resonant circuit 20 but is less than that of the average self-quench period of the superregenerative circuit, for example about 1/5 thereof. The capacitance value of the condenser 19 of the auxiliary resonant circuit 20 is effective to determine the width of the saturation-level anode-current pulse periodically flowing through the tube 10, while the elements comprising the condenser 19, the resistor 24, and the inductor 22 determine the wave form of the quench voltage. The capacitance of the condenser 19 is ordinarily selected to provide a saturation-current pulse having a duration from about 10 per cent. to 15 per cent. of the quench period.

The receiver further includes an impedance coupled between two of the electrodes of tube 10 for deriving from the electrode current therebetween during each quench cycle a control effect which assures the self-quenching of the superregenerative circuit. This impedance may, for example, comprise the resistor 24 which is coupled between the anode and the cathode of the tube 10. The value of the resistor 24 is selected to provide the desired amount of damping for the resonant circuit 20, as will be explained more fully hereinafter.

The superregenerative receiver preferably includes a time-constant network 25 coupled between the control electrode 11 and the cathode 17 of the tube 10 and having a time constant which is generally much greater than the average self-quench period of the superregenerative circuit. This network includes an adjustable resistor 26 having one terminal coupled to an adjustable tap 30 of a voltage divider 31, the end terminals of which are connected to a source of potential indicated as +B. The resistor 26 has another terminal connected to the control electrode 11 of the tube 10. The network 25, which also includes a condenser 27 coupled between the control electrode 11 of the tube and ground, provides stabilization of the operating characteristics of the superregenerative circuit against variations of operating conditions which tend to modify the average self-quench periodicity thereof. The network 25 is effective to provide grid-circuit stabilization of the type disclosed and claimed in applicant's copending application Serial No. 788,765, filed November 27, 1947, and entitled "Self-Quench Superregenerative Receiver." The value of the resistor 26 of the network 25 and the condenser 19 of the network 20 primarily determine the average self-quench frequency of the superregenerative receiver. This results since the condenser 19 controls to a considerable extent the value of the anode current during each quench cycle while the resistor 26 and the potential applied thereto determine the control electrode-cathode operating bias. A radio-frequency by-pass condenser 29 is coupled in shunt with the condenser 27.

Received wave signals are applied to the signal-resonant circuit 13 of the receiver by an antenna-ground system 35, 36 which is inductively coupled to the inductor 16. Modulation components of the received wave signal are derived across the resistor 24 by the operation of the superregenerative circuit and are applied to a conventional low-pass filter network 38 the components of which have values so selected as to remove quench-frequency components appearing in the output signal of the superregenerative circuit. The output terminals of the filter network 38 are coupled to a signal-reproducing device 40 through a coupling condenser 37 and a conventional audio-frequency amplifier 39.

Considering briefly the operation of the receiver of Fig. 1, but neglecting for the moment any detailed consideration of the influence of the auxiliary resonant circuit 20 on the operation of the receiver, the condenser 19 is charged from the potential source +B through the resistor 24, the inductor 22, and the choke coil 23 and is thereafter discharged through the space-current path of the tube 10. During the conductive intervals of tube 10 when the condenser 19 is being discharged, the regenerative circuit of the receiver generates oscillations at a frequency determined by the parameters of the signal-resonant circuit 13. These oscillations are quenched during the succeeding operating interval in which the tube 10 is nonconductive and during which the condenser 19 commences to be recharged from the source +B and from energy stored in the inductor 22. Shortly thereafter when the potential of the condenser 19 has reached a sufficiently high potential level, the tube again becomes conductive and the described cycle of operation is repeated during each self-quench period of the receiver. Modulation components of a wave signal applied to the superregenerative circuit from the antenna system 35, 36 are derived across the resistor 24, in a conventional manner, by virtue of the self-quench operation of the superregenerative circuit. This operation briefly is as follows. The self-quench period of the superregenerative circuit varies dynamically in accordance with the amplitude modulation of the received wave signal and these dynamic variations of the quench rate are manifest as dynamic variations of the anode current of the tube 10. Accordingly, a voltage which varies with the derived modulation components is developed across the resistor 24 for application through the filter network 38 to the audio-frequency amplifier 39 for further amplification therein and translation to the signal-reproducing device 40. During operation the network 25 stabilizes the average self-quench frequency of the receiver in a manner fully described in applicant's abovementioned copending application.

In considering in greater detail the effect of the auxiliary resonant circuit 20 and the stabilizing network 25 on the operation of the receiver, reference is made to the anode quench-voltage curves A, B, and C of Fig. 2*a*. It will be assumed initially that the resistor 26 and the tap 30 of the stabilizing network 25 have been adjusted to establish, during operation, a predetermined control electrode-cathode bias. Assuming that the average amplitude of the modulated carrier signal is substantially constant, the instant at which quenching occurs is determined by the control electrode-cathode bias of the tube 10 as established by the particular adjustment of the resistor 26 of the stabilizing network 25 and the tap 30. Curve A is representative of the condition obtaining with the smallest bias, curve B that for the case of a somewhat larger or nominal operating bias, and curve C that for the condition of the largest bias. This will be manifest since a small control electrode-cathode bias, which permits a high negative conductance, permits the self-quench rate of the superregenerative circuit to increase due to the rapid build-up of oscillations and consequent early attainment of the saturation-level amplitude thereof. The operation will first be considered for the condition in which the quench voltage has the wave form represented by curve B.

It will also be assumed that the receiver has been operating over a period of several quench cycles and that at time $t_1$ the condenser 19 has discharged from a high-voltage level to a sufficiently low-voltage level that the tube 10 is no longer conductive. This last-mentioned level is represented by the horizontal broken line and constitutes the anode-voltage cutoff level with reference to oscillations developed in the signal-resonant circuit 13. The anode current of the tube 10, which constitutes the rectification component of the saturation-level current, also has fallen quickly to zero at time $t_1$, as represented in Fig. 2b by the sloping line at the left. This sudden change in current is effective to shock excite the auxiliary resonant circuit 20 since energy stored in the inductor 22 cannot be dissipated instantaneously. Energy from the inductor 22 is transferred to the condenser 19 and the condenser charges during the interval $t_1$–$t_3$, as represented by the solid-line curve of Fig. 2a, at a rate determined by the resonant frequency of the auxiliary resonant circuit 20 and the damping afforded by the resistor 24. It will be seen from the drawing that the anode voltage of the tube 10 may increase to a value which is substantially greater than that of the energizing source +B and, in fact, may rise to a value slightly less than twice the potential value of this source. At time $t_2$, Fig. 2b, a very small anode current begins to flow in the tube 10 as shown by the broken-line curve B. To clarify the illustration, the magnitude of the initial current in the vicinity of time $t_2$ has been greatly exaggerated. At approximately time $t_3$ the anode current increases at a rapid rate, due to control-electrode rectification of the high amplitude oscillations, and reaches its maximum value at time $t_3$. During this saturation-level interval, the large anode current rapidly discharges the condenser 19 through the space-current path of the tube, thus lowering the anode potential to the point where the anode-current pulse and the saturation-level interval of the superregenerative circuit are terminated. During the saturation-level interval, the time constant of damping of the auxiliary resonant circuit 20 is much shorter than the average self-quench period of the superregenerative circuit due to the relatively low value of anode-to-cathode conductive impedance of the tube 10. At time $t_4$, the condenser 19 again commences to recharge, another resonant rise in the anode potential of the tube 10 occurs in the manner just described, and the cycle of quench operation is repeated. The major portion of the anode current flows during the saturation-level period of each quench cycle.

It will be clear from the foregoing explanation and from Fig. 2a that the auxiliary resonant circuit 20 has a substantial control of the wave form of the self-quench voltage of the superregenerative circuit. The maximum value of the self-quench voltage produced at the anode of the tube 10 may be approximately twice that which may be procured in a conventional self-quench superregenerative receiver which lacks such an auxiliary resonant circuit. The high value of self-quench voltage which is derived in the superregenerative circuit, even though an energizing source having a relatively low value of potential is employed, produces a number of significant advantages. The high transconductance which may be realized from the regenerator tube 10 during the interval $t_1$–$t_3$, due to the high anode potential and hence the high anode current, is effective to provide a fast rate of increase for the amplitude of oscillations and permits oscillations to build up to a high amplitude level. This is particularly important during the operation of the receiver at very high self-quench rates when the necessary superregenerative gain must be realized during the extremely short oscillation build-up intervals. The high value of anode current which is procured from the tube 10 also provides a high output of the audio-frequency modulation components of the derived signal. The use of the auxiliary resonant circuit 20 in the receiver permits the use of a relatively high negative control electrode-cathode operating bias for the regenerator tube. This high negative bias in turn helps to procure the desired periodic interruption of oscillations, so that the receiver tends to operate more reliably in the desired superregenerative manner rather than as a continuous-wave oscillator.

The resistor 24 in the anode circuit of the tube 10 performs an important function in the operation of the superregenerative circuit including the auxiliary resonant circuit 20, particularly when a fixed bias is employed in the control electrode-cathode circuit of the tube 10 in place of the stabilizing network 25. When the resistor 24 is omitted from the circuit, it has been found that the receiver will not always commence to operate as a self-quench superregenerative circuit when the operating potentials are applied in a particular manner or order. For example, when the anode energizing potential is gradually increased in value, the arrangement may sometimes operate stably as a continuous-wave oscillator. On the other hand, when the energizing potentials are applied in a different manner, such as when applied at a rapid rate so that a rapidly changing current produces a large potential drop across the inductor 22, the desired self-quenching action may take place so that the receiver performs as a self-quench superrengenerative receiver. Obviously, the possibility of having two entirely different stable modes of operation in a receiver is undesirable.

When the receiver momentarily generates continuous-wave oscillations, anode current flows through the regenerator tube and the resistor 24. This current produces a voltage drop across the resistor 24 which is effective to reduce the anode potential regardless of the rate at which the current starts to flow. This potential change, in turn, assures the desired self-quenching of oscillations in the signal-resonant circuit 13 of the superregenerative circuit, thus preventing any further tendency of the receiver to generate continuous-wave oscillations. Consequently stable operation in the continuous-wave mode will not continue to exist regardless of the order or the rate at which energizing potentials are applied to the receiver. The voltage developed across the resistor 24 during quenching need be but a small fraction of that appearing across the inductor 22.

When the stabilizing network 25 is employed, it may also assist in assuring that a stable continuous-wave mode of oscillation cannot continue to exist. During the saturation-level intervals, control-electrode rectification takes place and a small control-electrode bias is produced across the network 25 as a result thereof. This bias is effective, by altering the transconductance of the tube 10, so to assist in reducing or quenching the amplitude of the oscillations developed in the signal-resonant circuit 13 that the receiver is made to operate in the desired superregenerative mode rather than in an undesirable continuous-wave mode. The control effects which are derived by both the resistor 24 and the network 25, and which are effective to control the periodic blocking of oscillations, are particularly desirable when the superregenerative receiver is being operated at very high self-quench frequencies.

The wave form of the anode-current pulses and representative conductance characteristics for each of the three operating conditions A, B, and C of Fig. 2*a* is represented in Figs. 2*b* and 2*c*, respectively. It will be seen from the curves of Figs. 2*a* and 2*b* that the maximum amplitude of an anode-current pulse and also the width of the maximum amplitude portion thereof are proportional to the anode voltage at which anode-current saturation takes place. The anode-current pulse B of Fig. 2*b* has the greatest amplitude and the greatest width since anode-current saturation occurs at the instant $t_3$ when the quench voltage is at its crest value, at which time the greatest amount of energy is stored in the condenser 19 of the auxiliary resonant circuit 20.

Assume as before that the amplitude value of the carrier component of the received wave signal is substantially constant. Reference is now made to Fig. 2*d* of the drawings where there is represented to an enlarged scale a portion of the quench-voltage curves of Fig. 2*a*. The curves of Fig. 2*d* are somewhat exaggerated in order to facilitate an understanding of an important feature of the invention. The vertical lines $h_a$, $h_b$ and $h_c$ correspond in height to the maximum amplitudes which are reached by the quench voltage just prior to saturation for each of the three respective operating conditions A, B, and C. The maximum amplitudes of the respective anode-current pulses are proportional to the heights of these vertical lines. The anode-voltage cutoff level for each of the three conditions just mentioned is approximately the same. Although the anode-voltage change just mentioned is actually more nearly exponential in character, it may be considered as substantially linear and is so shown for the purpose of the present consideration. The lengths of the horizontal lines $T_{PA}$, $T_{PB}$, and $T_{PC}$ (corresponding to the bases of the three similar triangles) are proportional to the widths of the saturation-level pulses of anode current for the three respective operating conditions.

It will be seen from Fig. 2*d* that the anode quench-voltage wave is relatively flat when saturation occurs in the vicinity of point *b*. Thus, when the receiver is adjusted to have a quench voltage of the wave form B and the amplitude of the received wave signal changes in value due to modulation, the anode-current pulse widths remain approximately equal to $T_{PB}$ and hence substantially constant over a range of dynamic levels as represented by curve B of Fig. 2*e*. However, the quench frequency increases with an increase in the amplitude of the received wave signal produced by modulation, as represented by curve B of Fig. 2*f*, due to decreasing values of the oscillation build-up interval. Therefore, the average value of the anode current increases at a moderate rate with dynamic variations of the received signal due to modulation, as represented by curve B of Fig. 2*g*.

Assume now that the operating bias of the superregenerative receiver is adjusted by adjustment of the resistor 26 and the tap 30 so that the quench voltage reaches its maximum amplitude at a time when the latter is immediately preceded by a positive or up-slope portion of the quench voltage, as represented at point *a* of Fig. 2*d*. If an increase in the dynamic level of the received signal then occurs, the anode-current pulse width decreases so that its value is less than $T_{PA}$. The manner in which the anode-current pulse width decreases with changes in the dynamic level of the received wave signal is represented by curve A of Fig. 2*e*. The quench frequency increases, however, due to the saturation level occurring earlier in the quench cycle, and the variation in quench frequency may therefore be represented by curve A of Fig. 2*f*. The average value of the anode current ordinarily increases gradually as represented by curve A of Fig. 2*g*.

On the other hand, when the operating bias of the receiver is so adjusted that the anode quench voltage reaches its maximum amplitude, then decreases at a moderate rate on the negative or down-slope portion of the wave and thereafter suddenly decreases in the value represented at point *c* of Fig. 2*d*, and the amplitude of the received wave signal increases in value due to modulation, the anode-current pulse width increases at a fast rate as represented by curve C of Fig. 2*e*. The quench frequency now increases somewhat more slowly, as represented by curve C of Fig. 2*f*, while the average value of the anode current increases very significantly as represented by the correspondingly identified curve of Fig. 2*g*. It will be apparent from curve C of Fig. 2*g* that a self-quench superregenerative receiver which is adjusted for operation on the down slope of the quench-voltage wave form has a very high modulation-signal output, which output is considerably greater than that which is afforded when the receiver is adjusted to quench on either the up-slope portion or the flat portion of the quench-voltage wave form. Thus the resistor 26 comprises a bias-control means for controlling the value of the bias potential applied to the control electrode of tube 10 so to control the wave form of the self-quench voltage of the superregenerative circuit as to include in the wave form during the oscillatory build-up interval a first portion sloping in a predetermined or upward sense followed by a second portion sloping in the opposite or downward sense and which includes during the saturation-level interval of the superregenerative circuit a third portion sloping in the aforesaid opposite sense. It has been found that a self-quench superregenerative receiver employing an auxiliary resonant circuit of the type described and adjusted to quench on the down slope of the anode quench-voltage wave form is capable of providing a higher audio-frequency output than has heretofore been obtained with known types of self-quench superregenerative receivers.

As has been more fully explained in applicant's above-mentioned application Serial No. 788,765, variations in the average amplitude of the wave signal applied to the signal-resonant circuit 13 by the antenna system 35, 36 and variations in such operating conditions as changes in anode energizing potential and changes of the transconductance of the tube 10 undesirably tend to modify the average self-quench periodicity of the receiver. However, the time-constant network 25, which is responsive to the control-electrode current flowing therein only during the saturation-level intervals of the superregenerative circuit, develops and applies to the control electrode of the regenerator tube 10 a gain-control potential which is effective to maintain the average value of the control-electrode current and the average self-quench frequency substantially constant, thereby stabilizing the operating characteristics of the receiver against variations of the type mentioned above. This characteristic of the stabilizing network 25 may be utilized to procure unusually good stabilization when the resistor 26 thereof is so adjusted that the quenching action in the superregenerative circuit takes place on the down slope of the quench-voltage wave form as described above.

The manner in which this excellent stabilization is provided will now be explained in connection with the curves of Figs. 2*h* to 2*j*. For this purpose, it will be assumed that the received signal is unmodulated and that only the average amplitude of the received wave signal is so varied as to increase in value. The curves A, B, and C represented in Fig. 2*h* for the three operating conditions previously considered in connection with Fig. 2*d* extend to the right in Fig. 2*h* from the point of intersection thereof representing the noise level of the receiver. Since the value of the control-electrode current of the regenerator tube is approximately proportional to the anode current thereof, the curves A, B, and C represent the variations of either current with wave-signal average amplitude variations. Curve A has a negative or downward slope indicating that the control-electrode-current and the anode-current pulse widths decrease with an increase in the wave-signal average amplitude. This results since these pulse widths are proportional to the anode voltage at which saturation occurs, as mentioned above in connection with Figs. 2*d* and 2*e*. Likewise curve B effectively has no slope indicating that the pulse widths remain substantially constant with wave-signal average amplitude. Curve C has a positive or upward slope since the anode-current and the control-electrode-current pulse widths increase with an increase in the wave-signal average amplitude.

Fig. 2*i* represents graphically the tendency of the control-electrode bias to vary with an increase in the wave-signal average amplitude of the received wave signal as a result of the gain-control potential derived by the stabilizing network 25 from the control-electrode current flowing in the regenerator tube 10 during each self-quench cycle. The curves A, B, and C all have a positive or upward slope, curve C having the greatest slope since the widths of the control-electrode current pulses are greatest for this condition. Due to the change or increase experienced in the self-quench frequency for each of the three operating conditions, the combined effect of the change in control-electrode current and the quench frequency results in the control-electrode bias curves of Fig. 2*i* having different slopes from the corresponding curves of Fig. 2*h*. The horizontal line designated "no stabilization" in Fig. 2*i* represents the condition when a stabilizing network such as the network 25 is omitted from the receiver circuit and a fixed control electrode-cathode bias source is substituted therefor.

Fig. 2*j* represents the change in the average self-quench frequency of the superregenerative circuit with increase in the wave-signal average amplitude value for the three operating conditions A, B, and C of Fig. 2*d*. These curves show graphically the effect on the average self-quench frequency of the control-electrode bias developed by the stabilizing network 25. It will be seen from curve A of Fig. 2*j* that the average self-quench frequency increases steeply but has a smaller slope than the curve designated "no stabilization." Curve B of Fig. 2*j* has a still smaller slope than for the conditions just mentioned, while curve C is relatively flat due to the stabilizing effect produced by the large rate of change of control-electrode bias developed by the relatively large rate of change of control-electrode current with signal level. It will be seen from curve C of Fig. 2*j*, therefore, that the conjoint action of the auxiliary resonant circuit 20 and the stabilizing network 25 is effective, when the latter is adjusted so that the quenching action occurs on the down slope of the quench-voltage wave form, to provide a very high degree of stabilization which is effective to maintain the average self-quench frequency of the superregenerative circuit substantially constant even though the average amplitude of the received wave signal may vary over a wide range of values.

Since the parameters of the inductor 22, the condenser 19, and the resistor 24 are effective to determine the shape of the quench-voltage wave, the values thereof may be selected to provide a resonant frequency and desired amount of damping for the auxiliary resonant circuit 20 to establish a wide variety of desired shapes of the quench-voltage wave form. By way of illustration of but a few of the possibilities, these parameters may be proportioned to provide quench-voltage wave forms of the type represented by the curves P, Q, and R of Fig. 2*k*, which wave forms and the maximum values thereof cannot be obtained in a self-quench superregenerative circuit employing resistor-condenser quenching networks. The conductance time characteristics for the last-mentioned quench-voltage wave forms are represented by Fig. 2*l*, corresponding curves of Figs. 2*k* and 2*l* having corresponding designations. Since the nose selectivity of a superregenerative circuit is determined by the rate of change of conductance as the characteristic passes through zero from a positive to a negative value, the nose selectivity for the case in which the conductive characteristic has a relatively small slope (as for the curve R of Fig. 2*l*) is better than can otherwise be obtained for high quench frequencies in conventional circuits. It may be noted that the very high gain which may be secured from the regenerator tube 10 during the oscillatory build-up interval makes it possible to procure good operation at high self-quench rates when the receiver has the conductance characteristic represented by curve R. The frequency-response or selectivity characteristic for each of the three cases just mentioned is represented by the curves P, Q, and R, of Fig. 2*m*, curve R indicating the case of best selectivity.

As illustrative of a specific embodiment of the invention, the following circuit constants are given for an embodiment of the invention of the type represented in Fig. 1:

| | |
|---|---|
| Condenser **14** | 15 micromicrofarads |
| Condenser **15** | 10 micromicrofarads |
| Condenser **19** | 250 micromicrofarads |
| Condenser **29** | 1,000 micromicrofarads |
| Condenser **27** | 25 microfarads |
| Resistors **18** and **24** | 10,000 ohms |
| Resistor **26** | 1 megohm (max.) |
| Resistor **31** | 50,000 ohms (max.) |
| Inductor **22** | 75 millihenries |

| | |
|---|---|
| Tube 10 | 1/2 Type 12AT7 |
| Resonant frequency of circuit 13 | 21.75 megacycles |
| Approximate quench frequency | 75 kilocycles |
| Approximate frequency of circuit 20 | 40 kilocycles |
| +B | 250 volts |

Fig. 3 is a circuit diagram of a self-quench superregenerative receiver embodying the present invention in a modified form which is essentially similar to that of Fig. 1, corresponding circuit elements being designated by the same reference numerals while similar elements are designated by the same reference numerals primed. This arrangement differs from that of Fig. 1 in that it includes an impedance network coupled between the control electrode and cathode of the tube 10 and having a time constant which may be of the same order of magnitude as each saturation-level interval of the superregenerative circuit, that is a time constant which is at least as great as that of the saturation interval. The impedance network performs a function similar to that accomplished by the resistor 24 in the Fig. 1 receiver. This network may be either one of two time-constant networks 50 or 51. The network 50 includes a condenser 52 which is coupled between the control electrode 11 of the tube 10 and ground, and also includes a resistor 53 which is coupled between the control electrode and the ungrounded terminal of the condenser 27 of the stabilizing network 25. A switch 54 is connected across the resistor 53 for a purpose presently to be explained. The time-constant network 51 includes a parallel-connected resistor 55 and condenser 56 which are coupled between the radio-frequency choke coil 21 and ground. A switch 57 is connected in shunt with the network 51 selectively to provide a short circuit across the network.

The operation of the arrangement of Fig. 3 is generally similar to that explained in connection with the arrangement of Fig. 1, hence the details thereof need not be repeated. The resistor 26 of the stabilizing network 25 may be adjusted, if desired, to provide a quenching action which occurs on the down slope of the quench-voltage wave form, thereby providing not only an audio-frequency output signal of high amplitude but also excellent stability of the operating characteristics of the receiver. When the switch 54 is closed effectively to remove the network 50 from the control electrode-cathode circuit of the tube 10, the switch 57 is left open to place the network 51 in circuit, or vice versa. It will be assumed for the moment that the switch 57 is closed and the switch 54 is open. During the saturation-level intervals of the superregenerative circuit, control-electrode current rectification takes place. The time-constant network 50 derives from the control-electrode current a gain-control potential or bias for application to the control electrode of the tube 10. This bias is of such magnitude and sense that it provides an increased control electrode-cathode bias during the discharge interval of the condenser 19 and during a brief interval thereafter, thus definitely assuring the self-quenching action of the superregenerative circuit during each self-quench period thereof. Assume on the other hand that the receiver is operating with the switch 57 open and the switch 54 closed. The large pulse of anode current flowing during each saturation-level interval of the superregenerative circuit develops across the network 51 a gain-control potential for application to the control electrode of the tube 10. This potential so reduces the gain of the tube that the potential developed across the network 51 is effective to aid in the quenching action of the oscillations developed in the superregenerative circuit. For some applications, it may be desirable in each of the two cases just mentioned in connection with the various operating positions of the switches 54 and 57 that the resistor 24′ also have such a value that it is effective to promote the self-quenching action of the superregenerative circuit. In the last-mentioned case, the action of the resistor 24′ is complementary to that of the particular network 50 or 51 which is used in the superregenerative circuit.

Fig. 4 is a circuit diagram of a self-quench superregenerative receiver embodying the invention in another modified form which is generally similar to that represented in Fig. 1. Accordingly, corresponding elements are designated by the same reference numerals and similar elements are designated by the same reference numerals primed or double primed. Either one of an auxiliary resonant circuit 20′ or an auxiliary resonant circuit 20″ may be coupled in the control electrode-cathode circuit of the tube 10. The resonant circuit 20′ includes a condenser 19′ which is coupled between the control electrode and ground and also includes an inductor 22′ and a resistor 24′ which are coupled in series between the control electrode 11 and the ungrounded terminal of the condenser 27. A switch 60 is connected in shunt with the resistor 24′ and the inductor 22′. The resonant circuit 20″ is coupled between radio-frequency choke coil 21 and ground and includes a condenser 19″ which is connected in parallel with a serially connected inductor 22″ and a resistor 24″. A switch 61 is coupled in shunt with the auxiliary resonant circuit 20″. The superregenerative circuit includes an anode-load resistor 63 and also includes a blocking condenser 64 which is coupled between the anode of the tube 10 and the junction of the condenser 14 and the inductor 16.

When the switch 60 is open and the switch 61 closed, a quench-voltage wave form similar in configuration to any of those represented in Fig. 2*a* but much smaller amplitude is developed by the resonant circuit 20′ for application between the control electrode and cathode of the tube 10. On the other hand when the switch 61 is open and the switch 60 closed, the resonant circuit 20″ is effective to derive a quench voltage similar in configuration to but of smaller magnitude than that shown in Fig. 2*a* for application between the control electrode and cathode of the tube 10. The quench voltage derived by the resonant circuits 20′ or 20″ in each instance, however, may have a variety of wave shapes other than that which could be obtained if a conventional resistor-condenser network were employed in lieu thereof for deriving the self-quench voltage. Consequently, the resonant circuits 20′ and 20″ are effective during operation to control the transconductance of the tube 10 to a considerably greater extent than if conventional resistor-condenser quenching network were utilized. Hence, most of the advantages over conventional self-quench superregenerative receivers which may be derived by the arrangements of Figs. 1 and 3 may also be derived by a receiver in accordance with the Fig. 4 embodiment of the invention. However, the amplitude of the modulation components derived from the received wave signal by the arrangement of Fig. 4 is somewhat smaller than that which may be obtained with the Fig. 1 arrangement due to the much smaller variation of the anode potential during each quench cycle. The resistors 24' and 24'' are effective, in the manner mentioned above in connection with the resistor 24 of the Fig. 1 arrangement, to assure the desired periodic interruption of the oscillations during each self-quench cycle of operation of the receiver.

From the foregoing description of the invention, it will be apparent that a self-quench superregenerative receiver embodying the present invention is particularly suited for operation at very high self-quench frequencies. Likewise, such a receiver is characterized by the high stability of its operating characteristics and by its high selectivity even though it is operated at high quench frequencies. It will also be apparent that a self-quench superregenerative receiver embodying the present invention is capable of providing exceptionally large power output with a relatively simple and inexpensive circuit arrangement. The high transconductance which may be procured from the regenerator tube of a self-quench superregenerative receiver in accordance with the present invention affords the advantage of great flexibility in the choice of wave shapes of the quench voltage when it is desirable that particular operating characteristics be obtained for the receiver. In addition to the above-mentioned advantages, a self-quench superrengenerative receiver embodying the present invention is characterized by its ability to start to operate and thereafter to continue to operate in the desired superregenerative manner regardless of the order or the rate at which the energizing potentials are applied thereto.

While there have been described what are at present considered to be the preferred embodiments of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. A self-quench superregenerative amplifier comprising: a self-quench saturation-level type of superregenerative circuit, including a regenerator tube having a plurality of electrodes including a control electrode and a cathode and having during saturation-level intervals of said circuit a nonlinear signal-translating characteristic for a wave signal applied to said circuit for deriving therein a rectification component of saturation-level current, a signal-resonant circuit coupled to said electrodes, and an auxiliary resonant quench-voltage generating circuit coupled between a predetermined pair of said electrodes and responsive to said rectification component for generating at least the major portion of a quench voltage of variable magnitude which periodically produces alternate build-up and oscillation-decay intervals in said signal-resonant circuit and effects superregenerative amplification of said applied wave signal; said auxiliary resonant circuit including a condenser and having a resonant frequency much less than that of said signal-resonant circuit and within the range of one-third to two-thirds the average self-quench frequency of said superregenerative circuit, the product of the capacitance of said condenser and the reciprocal of the conductance appearing between said pair of electrodes during each saturation-level interval of said superregenerative circuit causing said auxiliary resonant circuit to have during said interval a time constant of damping which is shorter than the average self-quench period of said superregenreative circuit; a time-constant network coupled between said control electrode and said cathode and having a time constant at least as great as that of said each saturation-level interval of said superregenerative circuit for deriving from the control-electrode current during each quench cycle a control effect which assures the self-quenching of said superregenerative circuit; and a time-constant network, having a time constant much greater than the average self-quench period of said superregenerative circuit and coupled between said control electrode and said cathode and responsive to an electrode current of said regenerator tube during at least said saturation-level interval of said superregenerative circuit, for developing and applying to said control electrode a gain-control potential effective to stabilize the operating characteristics of said amplifier against operating conditions which tend to modify the average self-quench frequency thereof.

2. A self-quench superregenerative amplifier comprising: a self-quench saturation-level type of superregenerative circuit, including a regenerator tube having a plurality of electrodes including a control electrode and a cathode and having during saturation-level intervals of said circuit a nonlinear signal-translating characteristic for a wave signal applied to said circuit for deriving therein a rectification component of saturation-level current, a signal-resonant circuit coupled to said electrodes, and an auxiliary resonant quench-voltage generating circuit coupled between a predetermined pair of said electrodes and responsive to said rectification component for generating at least the major portion of a quench voltage of variable magnitude which periodically produces alternate build-up and oscillation-decay intervals in said signal-resonant circuit and effects superregenerative amplification of said applied wave signal; said auxiliary resonant circuit including a condenser and having a resonant frequency much less than that of said signal-resonant circuit and substantially equal to one-half the average self-quench frequency of said superregenerative circuit, the product of the capacitance of said condenser and the reciprocal of the conductance appearing between said pair of electrodes during each saturation-level interval of said superregenerative circuit causing said auxiliary resonant circuit to have during said interval a time constant of damping which is shorter than the average self-quench period of said superregenerative circuit; a time-constant network coupled between said control electrode and said cathode and having a time constant at least as great as that of said each saturation-level interval of said superregenerative circuit for deriving from the control-electrode current during each quench cycle a control effect which assures the self-quenching of said superregenerative circuit; and a time-constant network, having a time constant much greater than the average self-quench period of said superregenerative circuit and coupled between said control electrode and said cathode and responsive to an electrode current of said regenerator tube during at least said saturation-level interval of said superregenerative circuit, for developing and applying to said control electrode a gain-control potential effective to stabilize the operating characteristics of said amplifier against operating conditions which tend to modify the average self-quench frequency thereof.

DONALD RICHMAN.

References Cited in the file of this patent

UNITED STATES PATENTS

| Number | Name | Date |
|---|---|---|
| 1,424,065 | Armstrong | July 25, 1922 |
| 1,726,806 | Chapin | Sept. 3, 1929 |
| 2,071,950 | Reinartz | Feb. 23, 1937 |
| 2,091,546 | Hruska | Aug. 31, 1937 |
| 2,412,710 | Bradley | Dec. 17, 1946 |
| 2,504,636 | Bradley | Apr. 18, 1950 |

FOREIGN PATENTS

| Number | Country | Date |
|---|---|---|
| 369,983 | Great Britain | Apr. 1, 1932 |
| 12,273/33 | Australia | Sept. 13, 1934 |